(12) United States Patent
Dunsmore et al.

(10) Patent No.: US 6,690,722 B1
(45) Date of Patent: Feb. 10, 2004

(54) METHOD FOR CHARACTERIZING FREQUENCY TRANSLATION DEVICES

(75) Inventors: Joel P Dunsmore, Sebastopol, CA (US); Michael E Knox, Manhasset, NY (US)

(73) Assignee: Agilent Technologies, Inc., Palo Alto, CA (US)

( * ) Notice: Subject to any disclaimer, the term of this patent is extended or adjusted under 35 U.S.C. 154(b) by 604 days.

(21) Appl. No.: 09/591,441

(22) Filed: Jun. 9, 2000

(51) Int. Cl.$^7$ .......................... H04B 17/00; G01R 35/00
(52) U.S. Cl. ........................................ 375/224; 324/601
(58) Field of Search ............................. 375/224, 232; 324/601, 615, 76.43, 76.29, 76.52

(56) References Cited

U.S. PATENT DOCUMENTS

| | | | | |
|---|---|---|---|---|
| 5,937,006 A | * | 8/1999 | Clark et al. .................. | 375/224 |
| 6,064,694 A | * | 5/2000 | Clark et al. .................. | 375/224 |
| 6,362,631 B1 | * | 3/2002 | Knox .......................... | 324/617 |
| 6,448,786 B1 | * | 9/2002 | Dunsmore et al. ........... | 324/601 |

* cited by examiner

Primary Examiner—Khai Tran
(74) Attorney, Agent, or Firm—John L. Imperato

(57) ABSTRACT

In a method for characterizing frequency translation devices (FTDs), a stimulus signal is applied to a first port of a frequency translation device and a drive signal is applied to a second port of the frequency translation device. A third port of the frequency translation device is coupled to an input of a filter. The frequency translation device, at the third port, provides a translated signal having a sum signal component and a difference signal component. A first, second and third reflection response to the applied stimulus signal are obtained with alternative terminations coupled to an output of the filter. The reflection responses include variations in either the sum signal component or the difference signal component as designated by the filter, where the variations depend on which of the alternative terminations is coupled to the output of the filter. As an alternative to the filter and alternative terminations, a frequency selective tuner is coupled to the third port of the FTD, providing variable impedance matches to a designated one of the signal components and providing an invariant impedance match to the signal component that is not designated. Flow graph terms for the frequency translation device and filter are extracted from the obtained reflection responses.

17 Claims, 6 Drawing Sheets

METHOD FOR CHARACTERIZING FREQUENCY TRANSLATION DEVICES

BACKGROUND OF THE INVENTION

Mixers, modulators and other types of frequency translation devices (FTDs) influence the performance of the communication systems in which they are included. By measuring the characteristics of the FTDs, designers of communication systems can compensate for conversion loss, phase nonlinearity and other characteristics of the FTDs, so that performance of the systems can be optimized. However, characterizing FTDs using known techniques is difficult. A technique disclosed by Clark et al. in U.S. Pat. No. 5,937,006 relies on three transmission measurements that are performed on three pairs of interchanged FTDs to extract characteristics of a designated one of the FTDs. Interchanging the FTDs is time consuming and can introduce measurement errors due to impedance mismatches between the pairs of FTDs and nonrepeatability in the integrity of the electrical connections between the interchanged FTDs. There is a need for a method for characterizing FTDs that has low measurement error and that is also quick to perform.

SUMMARY OF THE INVENTION

A method for characterizing frequency translation devices (FTDs) constructed according to the preferred embodiment of the present invention has low measurement error and is quick to perform. In the method, a stimulus signal is applied to a first port of a frequency translation device and a drive signal is applied to a second port of the frequency translation device. A third port of the frequency translation device is coupled to an input of a filter. The frequency translation device, at the third port, provides a translated signal having a sum signal component and a difference signal component. A first, second and third reflection response to the applied stimulus signal are obtained with alternative terminations coupled to an output of the filter. The reflection responses include variations in either the sum signal component or the difference signal component as designated by the filter, where the variations depend on which of the alternative terminations is coupled to the output of the filter. As an alternative to the filter and alternative terminations, a frequency selective tuner is coupled to the third port of the FTD, providing variable impedance matches to a designated one of the signal components and providing an invariant impedance match to the signal component that is not designated. Flow graph terms for the frequency translation device and filter are extracted from the obtained reflection responses.

DETAILED DESCRIPTION OF THE PREFERRED EMBODIMENT

Figure 1:
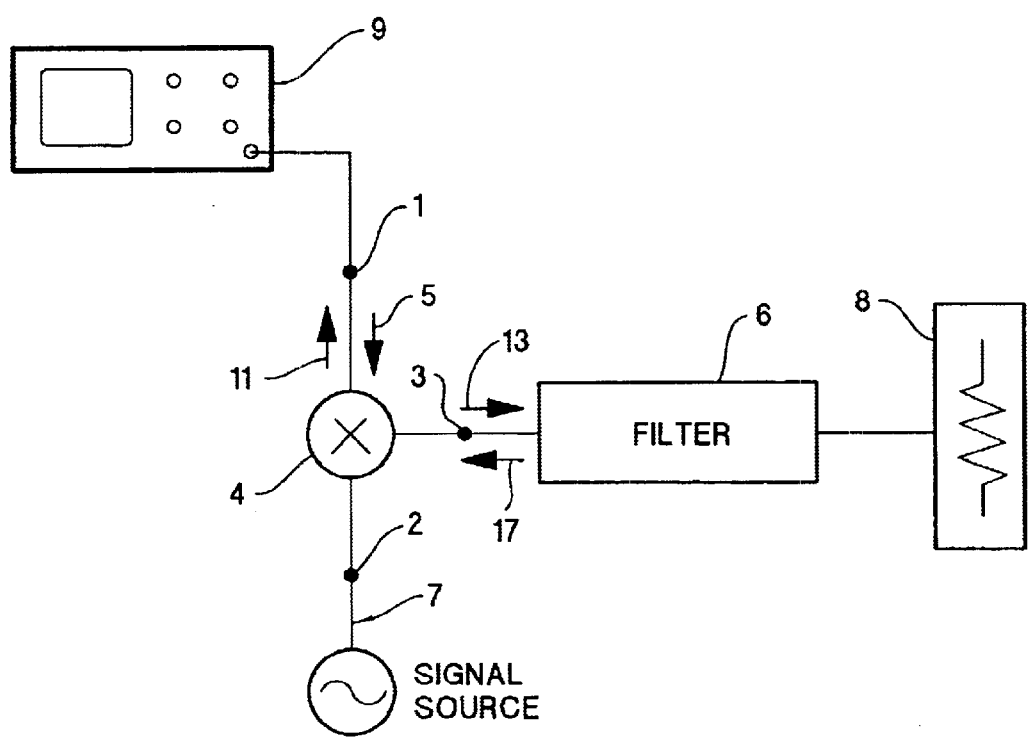
FIG. 1 shows a frequency translation device (FTD) configured for use with the characterization method constructed according to the preferred embodiment of the present invention.

FIG. 1 shows a frequency translation device (FTD) 4 configured for use with the characterization method constructed according to the preferred embodiment of the present invention. Typically, the FTD 4 is a mixer, modulator, system or component, producing a frequency translated signal 13 according to signals 5, 7 that are applied to the FTD 4. A first port 1 of the FTD 4 receives a stimulus signal 5 provided by a network analyzer 9 that is coupled to the FTD 4. A second port 2 of the FTD 4 receives a drive signal 7, such as a local oscillator (LO) signal from a SIGNAL SOURCE. A third port 3 of the FTD 4 is coupled to a filter 6. In this example, the FTD 4 is a mixer where the first port 1 is the mixer's RF port, the second port 2 is the mixer's LO port, and the third port 3 is the mixer's IF port. A typical FTD 4 generates a frequency translated signal 13 that includes signal components occurring at both the sum of the frequencies of stimulus signal 5 and the drive signal 7, and the difference of the frequencies of the stimulus signal 5 and the drive signal 7. The signal component occurring at the sum of the frequencies of stimulus signal 5 and the drive signal 7 is the sum signal component, and the signal component occurring at the difference of the frequencies of the stimulus signal 5 and the drive signal 7 is the difference signal component. A return signal 17 incident on the third port 3 of the FTD 4 also has a sum signal component occurring at the sum of the frequencies of stimulus signal 5 and the drive signal 7, and a difference signal component occurring at the difference of the frequencies of the stimulus signal 5 and the drive signal 7.

In the configured FTD 4, the filter 6 is shown as external to the FTD 4. Alternatively, the filter 6 is an internal component of the FTD 4. The filter 6 is readily implemented using a highpass, lowpass or bandpass filter, frequency selective attenuator or other frequency selective network. The filter 6 is terminated in at least three alternative terminations 8, such as an open circuit load, a short circuit load, and a matched load. These loads are preferably used as the alternative terminations 8 since they are readily available in network analyzer calibration kits. Offset loads are also suitable for the alternative terminations 8, and in general, the combinations of loads that are sufficient to perform a one-port calibration of a network analyzer are also suitable as the terminations 8 for alternative coupling to the filter 6.

The terminations 8 and filter 6 provide frequency-dependent impedance matches to the frequency translated signal 13, so that reflection of only a designated one of the sum and difference signal components of the frequency translated signal 13 and the return signal 17 varies, or changes, according to which of the alternative terminations 8 is coupled to the filter 6. The signal component of the frequency translated signal 13 and the return signal 17 that is not designated is invariant, or does not change, according to which of the alternative terminations 8 is coupled to the filter 6. The frequency-dependent impedance match provided by the filter 6 and alternative terminations 8 selectively passes or reflects either the sum signal component or the difference signal component. For example, the filter 6 substantially passes the sum signal component and substantially reflects the difference signal component under condition that the sum signal component is designated. The filter 6 substantially passes the difference signal component and substantially reflects the sum signal component under condition that the difference signal component is designated. Under either of the conditions, the alternative terminations 8 provide variable reflections of the signal component that is selectively passed by the filter 6. As an alternative to the filter 6 and alternative terminations 8, a frequency selective tuner (not shown) is coupled to the third port 3 of the FTD 4, providing variable impedance matches, or states, to a designated one of the signal components and providing an invariant impedance match, or state, to the signal component that is not designated.

Figure 2:
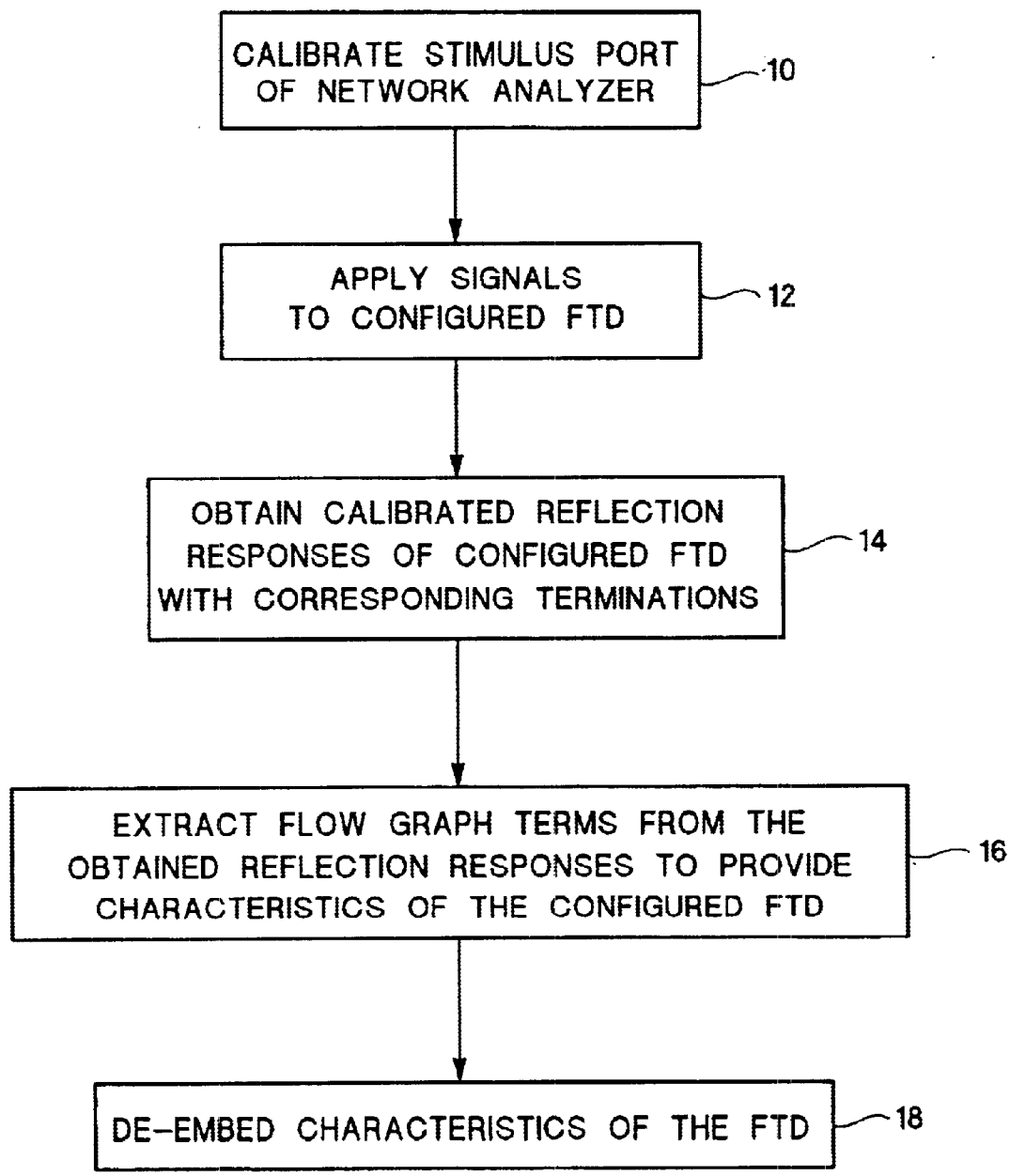
FIG. 2 is a flow diagram of a method for characterizing the FTD, constructed according to the preferred embodiment of the present invention.

FIG. 2 is a flow diagram of a method for characterizing the FTD 4, constructed according to the preferred embodiment of the present invention. The method includes steps 10–16, and optionally includes step 18.

In step 10, the network analyzer 9 is calibrated in preparation for a one-port reflection measurement. The calibration typically involves coupling multiple terminations to a stimulus port of the network analyzer 9, according to activated calibration routines of the network analyzer 9. Traditionally, an open-circuit load, a short-circuit load and an impedance matched load are used in this calibration of the network analyzer 9, since these loads are readily available in network analyzer calibration kits.

In step 12 of the flow diagram, a stimulus signal 5 is applied to the first port 1 of the FTD 4, configured as in FIG. 1. The drive signal 7 is applied to the second port 2 of the FTD 4 and the third port 3 of the FTD 4 is coupled to the filter 6. The stimulus signal 5 is a fixed-frequency signal, or alternatively, it is a swept-frequency signal. Under condition that delay characteristics of the FTD 4 are sought, the stimulus signal 5 preferably includes two or more frequencies, wherein these frequencies of the stimulus signal 5 that are adjacent, are also sufficiently close to result in less than 180 degrees of phase difference through the FTD 4.

In step 14, at least three reflection responses to the stimulus signal 5 are obtained for the configured FTD 4. The reflection responses are the scattering parameter S11, the reflection coefficient or any other measure of a reflected signal 11 received from the first port 1 relative to the stimulus signal 5 applied to the first port 1. Each of the reflection responses is obtained with a corresponding one of the alternative terminations 8 coupled to the filter 6 and each of the reflection responses obtained in step 14 includes correction according to the calibration of the network analyzer 9 performed in step 12. A first reflection response R1 is obtained with the impedance-matched load coupled to the filter 6. A second reflection response R2 is obtained with the short-circuit load coupled to the filter 6. A third reflection response R3 is obtained with the open-circuit load coupled to the filter 6. The reflection responses R1–R3 are obtained in any convenient order. Under condition that the frequency selective tuner is used instead of the filter 6 and terminations 8, the first reflection response R1, the second reflection response R2, and the third reflection response R3 are obtained by setting the tuner to have alternative impedance matches, or states, at the designated one of the signal components of the frequency translated signal 13 and return signal 17.

In step 16, flow graph terms, including a first term D, a second term M and a third term T, are extracted from the reflection responses obtained in step 14 based on a signal flow graph of the configured FTD 4. These flow graph terms provide the magnitude and phase of the reflection and transmission characteristics of the configured FTD 4. The first term D represents the input scattering parameter S11, or the input match, of the configured FTD 4. The second term M represents the output match of the configured FTD 4, including the characteristics of the filter 6. The third term T represents the two-way transmission or conversion characteristics of the configured FTD 4—the transmission T1 from port 1 to port 3 multiplied with the transmission T2 from port 3 to port 1. The square root of the transmission T provides the one-way transmission characteristic of the FTD 4, assuming the FTD 4 is reciprocal, that is, having transmission T1 from port 1 to port 3 equal to the transmission T2 from port 3 to port 1.

FIGS. 3A–3D are signal flow graphs of the one-port model of the configured FTD 4. Signal flow graphs are commonly used in network analysis. From the signal flow graphs three equations E1–E3 are derived. These three equations E1–E3 correspond to the three reflection responses R1–R3 obtained in step 14. The equations E1–E3 contain the flow graph terms D, M and T.

Figure 3A:
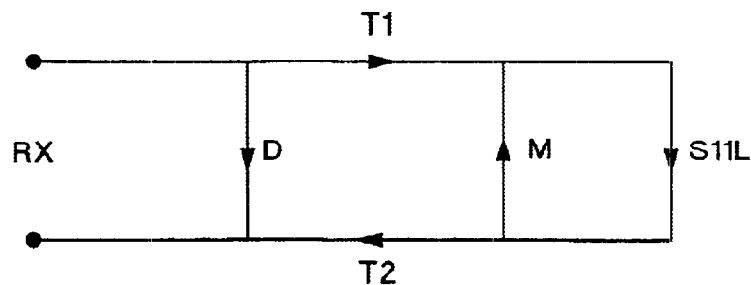
FIGS. 3A–3D are signal flow graphs of the FTD, configured as in FIG. 1.

FIG. 3A shows the general signal flow graph including the match S11L of the alternative terminations 8. The relationship between the flow graph terms derived from the general signal flow graph and a measured input reflection scattering parameter RX is as follows:

$$RX = D + S11L * T/(1 - M * S11L).$$

Figure 3B:
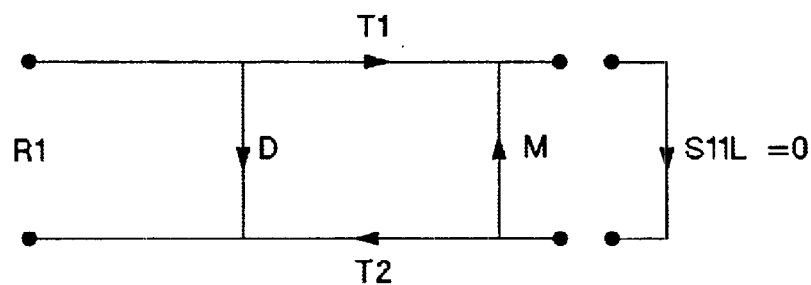

FIG. 3B shows a signal flow graph corresponding to the first reflection response R1, performed with the termination 8 as an impedance-matched load coupled to the filter 6. This load provides a match S11L equal to zero. This signal flow graph yields the first equation E1 as:

$$R1 = D \qquad (E1)$$

Figure 3C:
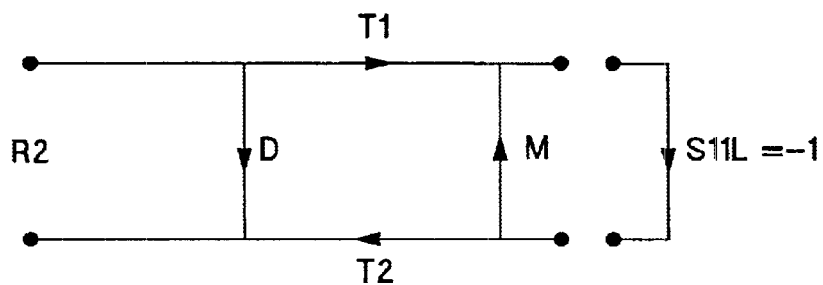

FIG. 3C shows a signal flow graph corresponding to the second reflection response R2, performed with the termination 8 as a short-circuit load coupled to the filter 6. This load provides a match S11L equal to −1. This signal flow graph yields the second equation E2 as:

$$R2 = D - T/(1 + M) \qquad (E2)$$

Figure 3D:
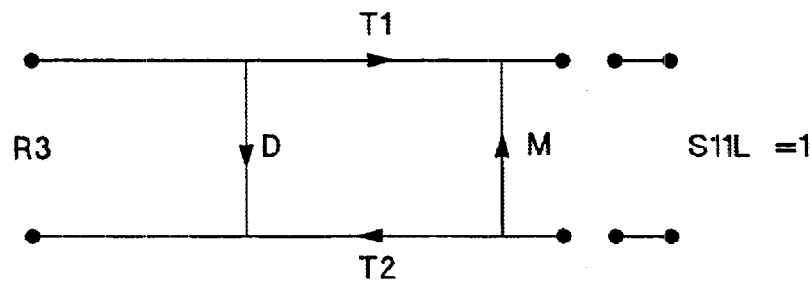

FIG. 3D shows a signal flow graph corresponding to the third reflection response R3, performed with the termination 8 as an open-circuit load coupled to the filter 6. This load provides a match S11L equal to 1. The signal graph yields the third equation E3 as:

$$R3 = D + T/(1 - M) \qquad (E3)$$

From the three equations E1–E3 resulting from reflection responses R1–R3 obtained in step 14 and derived from the signal flow graphs of FIGS. 3A–3D, the three unknown terms D, M and T are readily extracted. Under condition that combinations of alternative terminations 8 other than the impedance-matched load, short-circuit load and open-circuit load are used, or under condition that a frequency selective tuner is used as the alternative to the filter 6 and terminations 8, the obtained reflection responses R1–R3 result in a different set of independent equations E1–E3, from which the unknown flow graph terms are extracted by solving the resulting equations E1–E3 for the unknown terms.

Figure 4A:
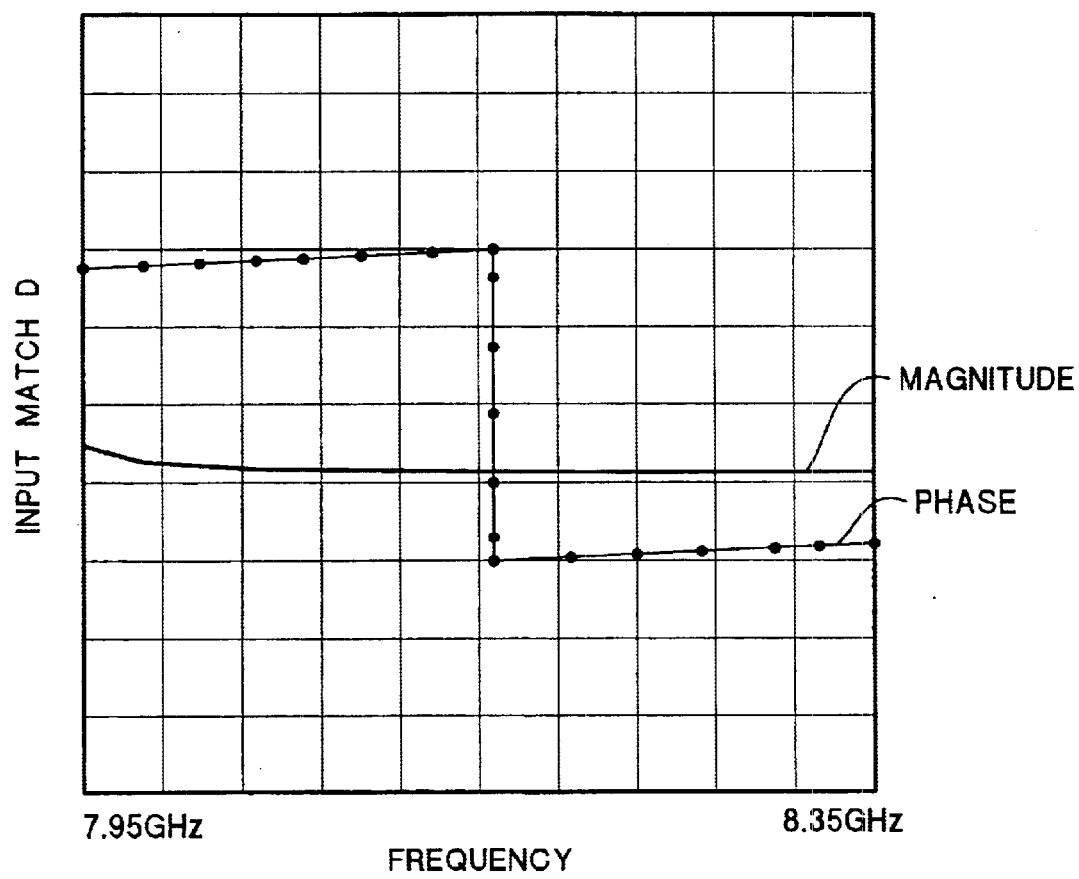
FIGS. 4A–4C show characteristics of the configured FTD resulting from the characterization method constructed according to the preferred embodiment of the present invention.
Figure 4B:
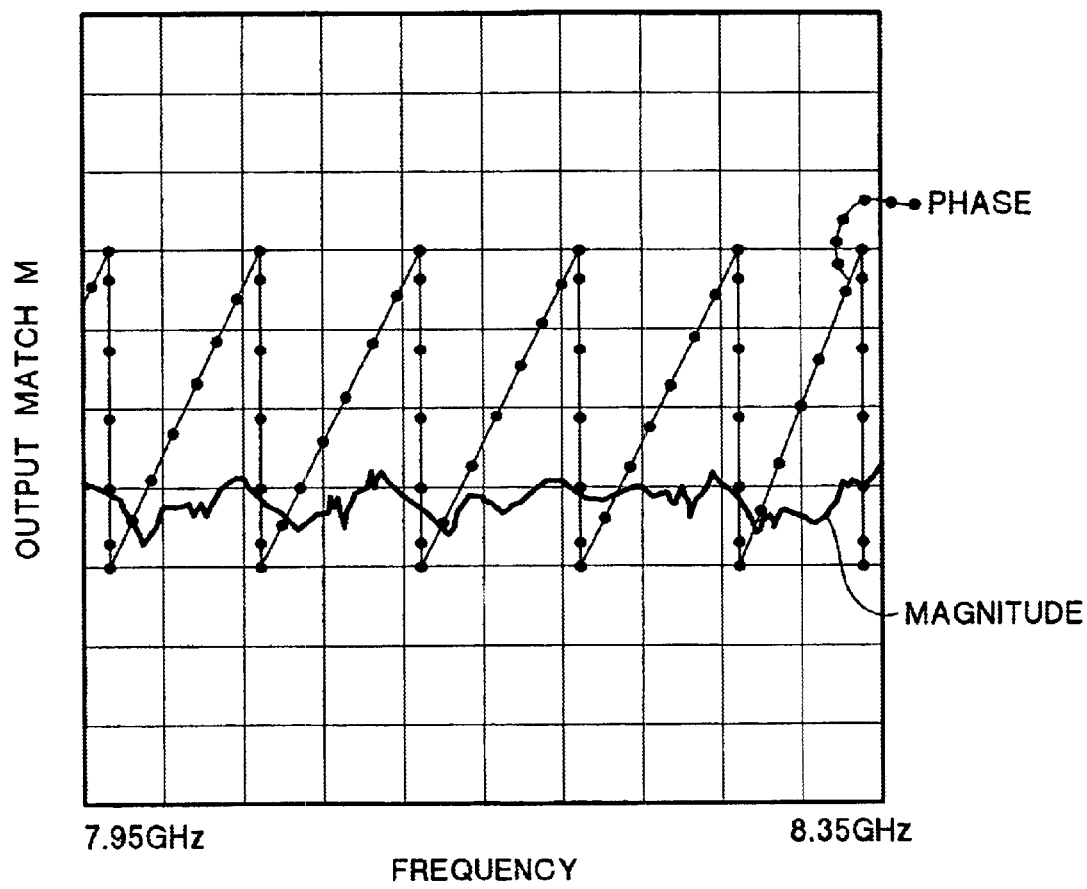
Figure 4C:
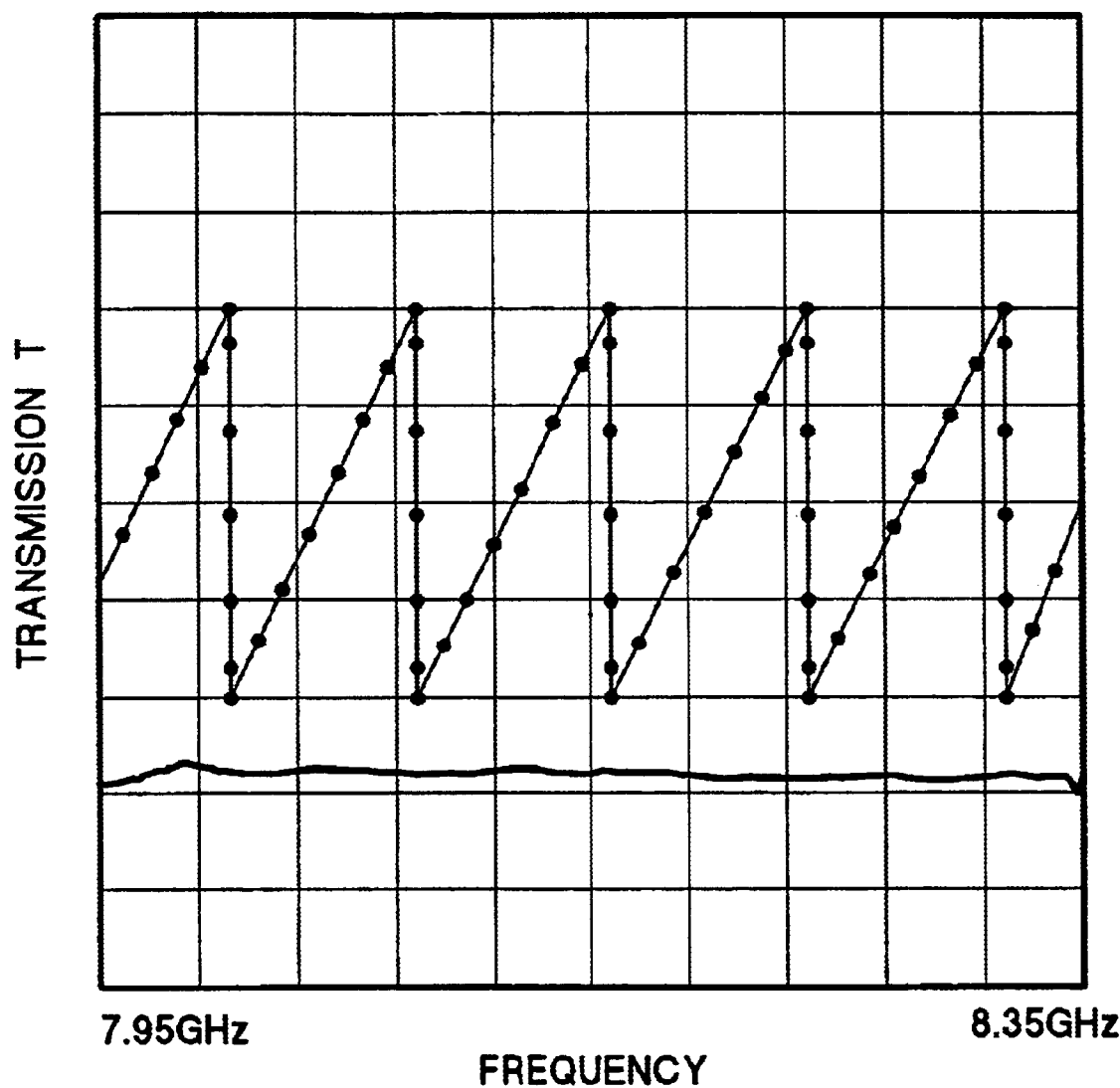

The magnitude and phase characteristics of the three flow graph terms can be displayed. FIGS. 4A–4C show characteristics of the configured FTD 4 versus frequency, resulting from steps 10–16 of the method constructed according to the preferred embodiment of the present invention. FIG. 4A shows magnitude and phase characteristics of the input match D. FIG. 4B shows magnitude and phase characteristics of output match M. FIG. 4C shows magnitude and phase characteristics of transmission characteristic T.

Step 18 is optionally included in the flow diagram of FIG. 2. Steps 10–16 of the flow diagram provide characteristics of the configured FTD 4, which includes those of the FTD 4 and those of the filter 6. When included, step 18 enables the characteristics of the FTD 4 to be isolated or de-embedded. Isolating the characteristics of the FTD 4 is performed for example, by characterizing the scattering parameters (S-parameters), ABCD matrix, transmission matrix or other sufficient characterization of the filter 6 to enable ordinary network analysis techniques to be applied to remove the effect of the filter 6. Under condition that the frequency selective tuner is used, the flow graph terms of the FTD 4 are isolated by applying ordinary network analysis techniques to remove the characteristics of the tuner.

While the preferred embodiment of the present invention has been illustrated in detail, it should be apparent that modifications and adaptations to this embodiment may occur to one skilled in the art without departing from the scope of the present invention as set forth in the following claims.

What is claimed is:

1. A characterization method for a frequency translation devices, comprising:

applying a stimulus signal to a first port of the frequency translation device and a drive signal to a second port of the frequency translation device, while a third port of the frequency translation device is coupled to an input of a filter, the frequency translation device at the third port providing a translated signal having a sum signal component and a difference signal component;

obtaining a first reflection response to the applied stimulus signal with a first termination coupled to an output of the filter, a second reflection response to the applied stimulus signal with a second termination coupled to the output of the filter, and a third reflection response to the applied stimulus signal with a third termination coupled to the output of the filter wherein the first reflection response, the second reflection response and the third reflection response include variations of one of the sum signal component and the difference signal component designated by the filter, the variations dependent on which of the first termination, the second termination and the third termination is coupled to the output of the filter;

extracting flow graph terms for the frequency translation device and filter from the obtained first reflection response, second reflection response and third reflection response.

2. The method of claim 1 wherein the flow graph terms include input match, output match and transmission characteristics.

3. The method of claim 2 wherein extracting the flow graph terms includes solving three independent equations based on the obtained reflection responses and including the input match, the output match and the transmission characteristics.

4. The method of claim 1 wherein the first termination is an impedance matched load, the second termination is a short-circuit load and the third termination is an open-circuit load.

5. The method of claim 2 wherein the first termination is an impedance matched load, the second termination is a short-circuit load and the third termination is an open-circuit load.

6. The method of claim 1 wherein the first termination, the second termination and the third termination include a combination of loads sufficient to perform a one-port calibration of a network analyzer.

7. The method of claim 2 wherein the first termination, the second termination and the third termination include a combination of loads sufficient to perform a one-port calibration of a network analyzer.

8. The method of claim 1 wherein the stimulus signal is provided by a network analyzer and the first reflection response, the second reflection response and the third reflection response are obtained by the network analyzer, wherein the network analyzer is calibrated for a one-port reflection measurement.

9. The method of claim 2 wherein the stimulus signal is provided by a network analyzer and the first reflection response, the second reflection response and the third reflection response are obtained by the network analyzer, wherein the network analyzer is calibrated for a one-port reflection measurement.

10. The method of claim 1 further including isolating the flow graph terms of the frequency translation device by removing the characteristics of the filter.

11. A characterization method for a frequency translation devices, comprising:

applying a stimulus signal to a first port of a the frequency translation device and a drive signal to a second port of the frequency translation device, while a third port of the frequency translation device is coupled to a tuner, the frequency translation device at the third port providing a translated signal having a sum signal component and a difference signal component;

obtaining a first reflection response to the applied stimulus signal with the tuner set to a first impedance state, a second reflection response to the applied stimulus signal with the tuner set to a second impedance state, and a third reflection response to the applied stimulus signal with the tuner set to a third impedance state wherein the first reflection response, the second reflection response and the third reflection response include variations in one of the sum signal component and the difference signal component designated by the tuner, according to which of the first impedance state, the second impedance state and the third impedance state the tuner is set;

extracting flow graph terms for the frequency translation device and tuner from the obtained first reflection response, second reflection response and third reflection response.

12. The method of claim 11 wherein the flow signal terms include input match, output match and transmission characteristics.

13. The method of claim 12 wherein extracting the flow graph terms includes solving three independent equations resulting from the obtained first reflection response, second reflection response and third reflection response for the input match, the output match and the transmission characteristics.

14. The method of claim 12 wherein the first impedance state, the second impedance state and the third impedance state are sufficient to perform a one-port calibration of a network analyzer.

15. The method of claim 11 wherein the stimulus signal is provided by a network analyzer and the first reflection response, the second reflection response and the third reflection response are obtained by the network analyzer, wherein the network analyzer is calibrated for a one-port reflection measurement.

16. The method of claim 12 wherein the stimulus signal is provided by a network analyzer and the first reflection response, the second reflection response and the third reflection response are obtained by the network analyzer, wherein the network analyzer is calibrated for a one-port reflection measurement.

17. The method of claim 11 further including isolating the flow graph terms of the frequency translation device by removing the characteristics of the tuner.

* * * * *